Figure 1:
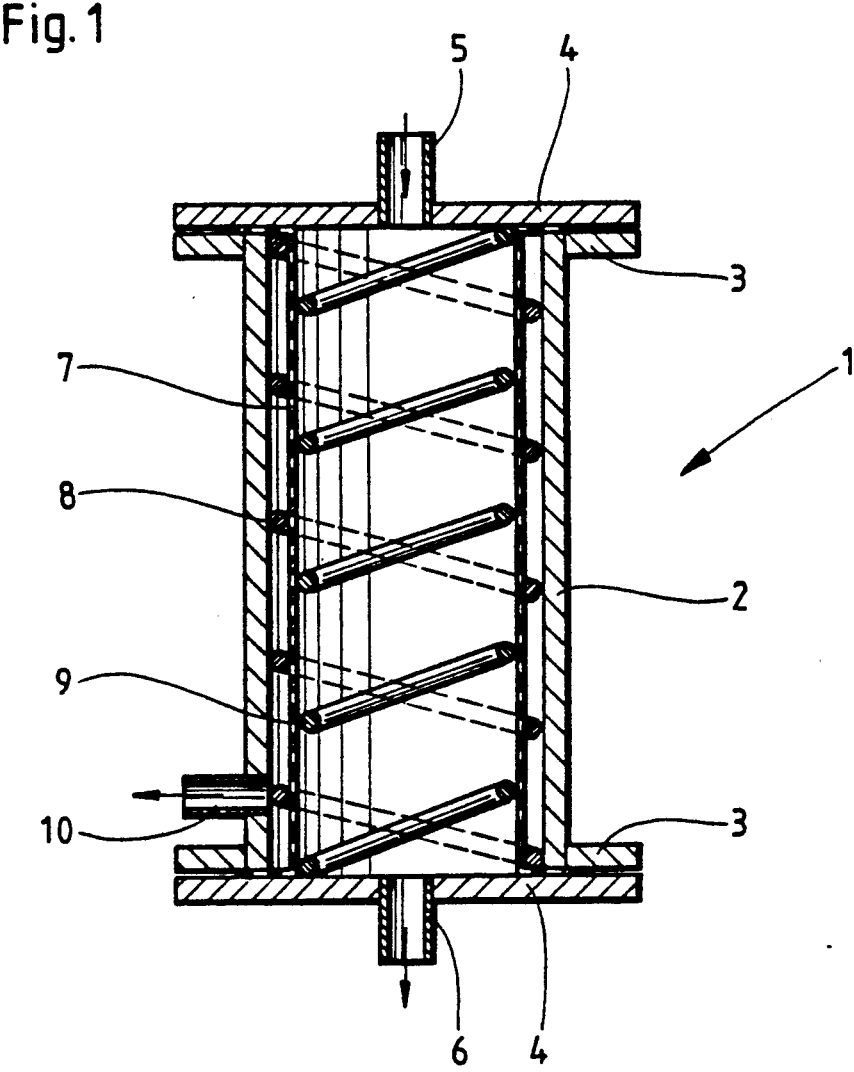

United States Patent [19]
Jorgens

[11] Patent Number: 5,294,339
[45] Date of Patent: Mar. 15, 1994

[54] ULTRAFILTRATION SEPARATOR

[76] Inventor: Klaus Jorgens, Am Flöthen 98, D-5600 Wuppertal 1, Fed. Rep. of Germany

[21] Appl. No.: 964,368

[22] Filed: Oct. 21, 1992

[51] Int. Cl.$^5$ .................. B01D 61/18; B01D 63/06
[52] U.S. Cl. .................. 210/321.78; 210/321.87; 210/494.2; 210/500.25
[58] Field of Search .......... 210/493.3, 500.25, 321.78, 210/321.87, 321.75, 321.84, 494.2, 509

[56] References Cited

U.S. PATENT DOCUMENTS 4,187,182  2/1980  Rosenberg .................. 210/493.3

FOREIGN PATENT DOCUMENTS 2629719  8/1976  Fed. Rep. of Germany .
2658405 12/1976  Fed. Rep. of Germany .
3332346  9/1983  Fed. Rep. of Germany .
3332348  9/1983  Fed. Rep. of Germany .

Primary Examiner—Frank Sever
Attorney, Agent, or Firm—Ostrolenk, Faber, Gerb & Soffen

[57] ABSTRACT

Ultrafiltration separator with a membrane made of a stainless steel or titanium wire weave with a wire diameter of less than 0.02 mm, exhibiting more than 2000 picks, i.e. more than 2000 pores per inch, with mesh openings less than 0.004 mm in size, whereby the direction of flow for the medium to be filtered is parallel to the membrane and elevations generating turbulence are positioned at the surface of the membrane, transverse to the direction of flow.

26 Claims, 2 Drawing Sheets

ULTRAFILTRATION SEPARATOR

The invention pertains to an ultrafiltration separator to remove so-called permeate, i.e. highly purified liquid in the form of ultrafiltration separator filtrate, from a liquid flowing continuously through the ultrafiltration separator. Ultrafiltration separators of this type are based on the principle of reverse osmosis and can be used to clean waste water, in dialysis, to sanitize air, to desalinate seawater and for many other purposes.

Membranes form the basis for every reverse osmosis or ultrafiltration system. These membranes are normally fabricated from any of a variety of polymer materials such as polysulfone or cellulose acetate and exhibit pores, the size of which determines the permeability of such membranes. The membranes are fitted at the rear with a backing material such as a polyethylene weave to increase mechanical strength.

The known ultrafiltration separators can be made up either as sandwich-type filters or as wrapped modules.

Ultrafiltration separators differ from conventional full-flow filters in that the medium to be filtered flows parallel to the surface of the membrane; due to the pressure differential across the membrane a small portion of the liquid diffuses through the membrane, whereby all constituents which are larger than the pores will be held back.

A particular application instance for this type of ultrafiltration separator is found in anodic or cathodic electrocoating. In this situation metallic objects or objects whose surface has been made electrically conductive are brought into contact with a liquid electrolytic paint charged with the opposite electrical polarity and which contains 8 to 23% solids. Applying direct current will cause electrocoagulation and the objects will be uniformly coated. The objects are then rinsed so that a uniform film free of runs remains, this being then baked. Pure water can be used for this rinsing process but this will generate large quantities of waste water which will have to be treated. Therefore the electrolytic paint is continuously pumped through an ultrafiltration separator and the ultrafiltrate, i.e. the permeate, is used to rinse the objects. The rinsing liquid, which has picked up a quantity of electrolytic paint, then flows back into the electrolyte vat so that electrocoating can be carried out virtually without waste, achieving about 98% utilization of the constituent materials. Furthermore, rinsing the electrocoated objects prevents application blemishes such as drops and runs. In this way a closed-loop system is achieved with full utilization of the quantity of materials in the bath, whereby no problems with waste water disposal will be encountered.

Ultrafiltrate must, however, be taken off continuously since the ultrafiltrate is in some cases now used as the liquid for rinsing and because the extraction of the ultrafiltrate serves to remove undesirable byproducts from the paint and makes possible stabilization of the bath.

The known ultrafiltration separators used for this purpose, operating with membranes based on porous plastic films, do not allow the use of high-temperature liquids; the recommended operating temperature is 30° C. and the maximum possible temperature is 90° C. The result is that these known ultrafiltration separators cannot be sterilized with steam and/or hot air. It is further necessary for the rinsing water used at a temperature of 80° C. for cleaning in large-scale systems to first be cooled to a temperature which can be tolerated by the known ultrafiltration separators prior to treatment in ultrafiltration separators and thereafter to be reheated to operating temperature. It is patently apparent that this will involve large amounts of heat loss.

Since the known ultrafiltration separators are very sensitive to coagulation or agglomeration, which would cause the pores to become clogged, the service lives of such commercially available ultrafiltration separator vary widely and can fluctuate between 0.5 hour and 4 months. The service life cannot be extended by flushing since the known ultrafiltration separators do not allow reverse-flow flushing, this being due to the mechanical sensitivity of the membrane. It is possible only to flush in the normal flow direction using certain solvents which will not attack the membrane, but this is not very effective. For this reason the filtration capacity declines continuously during use so that the ultrafiltration system will always have to be over-dimensioned initially to ensure that sufficient filtration capacity will still be available toward the end of the filter service life. It should finally be mentioned in addition that treating electrolytic paint used in anodic or cathodic electrocoating of objects presents problems since the paint pigments are very sharp and will cause early wear at all components in a coating system and in particular at the membranes in the ultrafiltration separators.

The object of the invention is to devise an ultrafiltration separator which exhibits high resistance to solvents and chemicals, high resistance to temperature and mechanical loading, making possible the application of aggressive solvents and sterilization when used in medical applications.

Based on this objective, it is proposed by way of invention that a metal wire mesh be used as the ultrafiltration separator membrane, made up of wire with a diameter of less than 0.02 mm, exhibiting more than 2000 picks, i.e. more than 2000 pores per inch, with the size of the mesh openings reduced to less than 0.004 mm by rolling or pressing the mesh flat. The metal wire mesh will preferably exhibit more than 3000 picks, i.e. more than 3000 pores per inch with the size of the mesh openings reduced to less than 0.004 mm by rolling or pressing the mesh flat. The metal wire mesh may be preferably fabricated from stainless steel, for example alloy 1.4301 stainless steel wire, or from titanium wires. The metal wire mesh can be used in one or more layers which are stacked or wrapped one over another. This type of metal wire mesh is produced by the Weisse und Eschrich company, Lauensteiner Strasse 20, in 8642 Ludwigstadt, Germany.

Thus an ultrafiltration separator membrane is available which embodies the properties of the metal wires used in its fabrication. The ultrafiltration separator membrane proposed by way of invention exhibits great mechanical strength and, due to the high modulus of elasticity, particularly for titanium, is only minimally deformable, so that the pores will not be dilated or will be dilated only to a minimal extent in response to the pressure differential prevailing across the membrane. The ultrafiltration separator membrane proposed by way of invention is resistant to corrosion and high temperatures and thus can be treated and cleaned with any desired solvents or bases and many acids and can be sterilized at high temperatures. The ultrafiltration separator membrane proposed by way of invention is insensitive to sharp-edged pigments in the electrolytic paint and can be cleaned by applying liquid in reverse flow.

The ultrafiltration separator membrane proposed by way of invention can preferably be arranged so as to be parallel to the direction in which the medium being filtered flows, whereby elongated elevations situated at a 90° angle to the direction of flow may extend considerable distances across the face of the membrane. In this way the main flow of the medium being filtered will be guided parallel to the membranae surface but any clogging of the pores will be prevented by these elevations, which create turbulence. The arrangement of the elongated elevations at an angle of 90° to the direction of flow will contribute to flushing away the solids which collect in the dead water zones at the elevations.

The elongated elevations may be woven into the membrane in the form of thicker wires. They can, however, also be positioned on the membrane, which will be the case in particular where the membrane is positioned on a rectangular or square frame with crossbars running transverse to the direction of flow. Due solely to the pressure differential between the two sides of the membrane, the crossbars located on the rear of the membrane will create on the front face of the membrane elevations sufficient to generate turbulence. The membrane can preferably be clamped between two rectangular or square frames with crossbars running transverse to the direction of flow, whereby the height of the crossbars on the pressurized side can be less than the height of the strips making up the frame.

Multiple frames with membranes can be arranged parallel one to the other to form a sandwich-type filter.

In another advantageous embodiment at least one cylindrical membrane can be located inside a pipe, at a distance from the inside wall of the pipe and sealed at the ends of the pipe, whereby the ends of the pipe can be fitted with end caps, the one being fitted with an inlet and the other with an outlet for the medium to be filtered.

A cylindrical helical spring in contact with the inside wall of the pipe can be used to maintain the distance between the membrane and the wall. This cylindrical helical spring may exhibit a wire diameter of 4 mm and a pitch of 30 mm at a pipe inside diameter of 80 mm, so that there is sufficient room between the turns of the wire to allow for collection and drainage of the permeate. The elevations which generate turbulence can be formed by the turns of a cylindrical helical spring inserted into and in contact with the inside surface of the cylindrical membrane. Due to the pitch of the cylindrical helical spring, the turns in the wire are at an inclined angle to the direction of flow for the medium being filtered so that the effect already mentioned is ensured, namely generating turbulence on the one hand and, on the other hand, carrying away solids which collect in the dead water zone at the turns of the wire.

The cylindrical helical spring serving as the spacer and the cylindrical helical spring forming the elevation to generate turbulence can be of opposed pitch, i.e., the one forming a left-hand helix, the other a right-hand helix.

The cylindrical helical spring located inside the cylindrical membrane may also exhibit a wire diameter of 4 mm and a pitch of 30 mm at a pipe inside diameter of 80 mm.

The medium being filtered can be guided along a helical patch through the interior space inside the cylindrical membrane by inserting in the space inside the cylindrical membrane a spiral-shaped strip, the width of which corresponds roughly to the inside diameter of the cylindrical membrane and which extends from the beginning to the end of the pipe.

There may be in the wall of the pipe at least one outlet for permeate, this being located at the same end of the pipe as the outlet for the medium to be filtered. Multiple permeate outlets may also be located along the wall of the pipe, between the turns of the cylindrical helical spring.

The throughput of a cylindrical ultrafiltration separator can be increased by arranging multiple, cylindrical membranes concentrically and at a distance one to the other inside a pipe of larger diameter and by providing the appropriate inlets and outlets for the medium being filtered and for the permeate.

Figure 2:
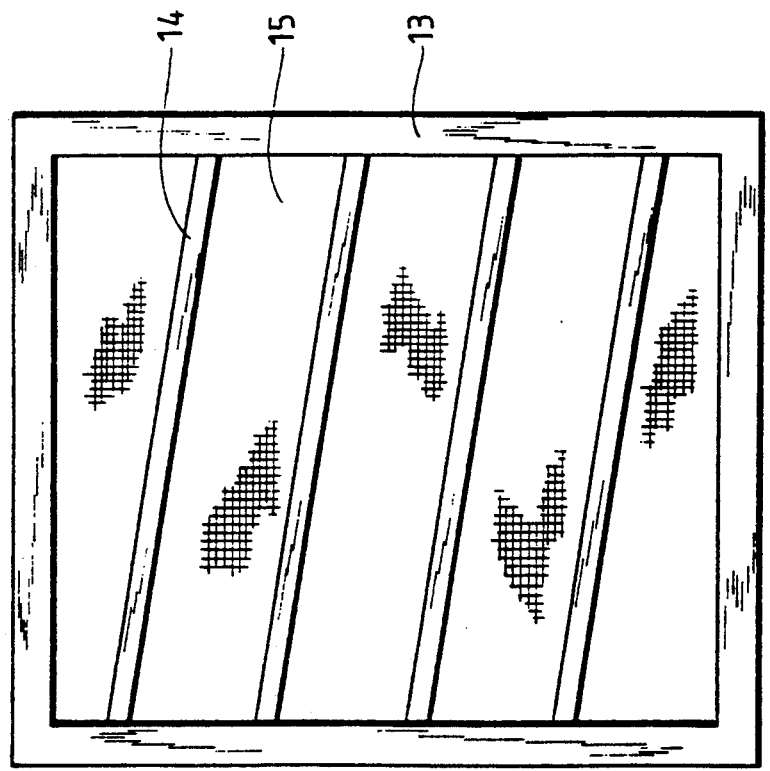

The invention is depicted in detail below using two embodiment examples illustrated in the drawing. Shown in the drawing are:

FIG. 1 a longitudinal section through a cylindrical ultrafiltration separator,

FIG. 2 a front view of a frame-shaped filter element, and

Figure 3:
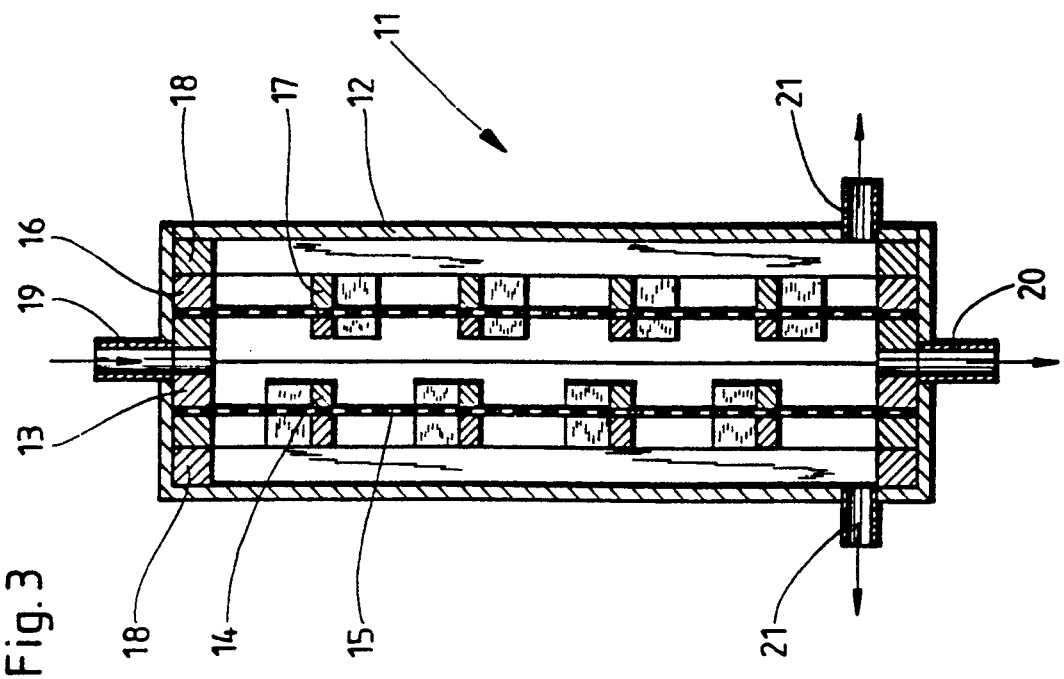

FIG. 3 a longitudinal section through a sandwich-type ultrafiltration separator.

A cylindrical ultrafiltration separator 1 comprises a pipe 2 at the ends of which flanges 3 are located. Bolted to and sealed against the flanges 3 are end caps 4. One end cap 4 is fitted with an inlet 5 while the other end cap 4 is fitted with an outlet 6 for the medium being filtered. The beaded ends of a cylindrical wire mesh membrane 7 are clamped between and sealed against the flanges 3 and the end caps 4. Several layers of the wire mesh membrane 7 may be wrapped one over another. A cylindrical helical spring 8 is located between the wire mesh membrane 7 and the inside wall of the pipe 2 and serves as a spacer to maintain the distance between the wire mesh membrane 7 and the pipe 2. A further cylindrical helical spring 9 is located inside the cylindrical wire mesh membrane 7 in such a way as to be in contact with the inside surface of the cylindrical wire mesh membrane 7. This cylindrical helical spring 9 may exhibit a pitch which is opposed to that of the cylindrical helical spacer spring 8. The cylindrical wire mesh membrane 7 is thus supported between the two cylindrical helical springs 8 and 9 making it possible to use the nipple in the pipe 2 serving primarily as the permeate outlet 10 to clean the cylindrical membrane 7 using a liquid applied in the reverse flow direction. This liquid may contain a solvent or a cleaning agent. It is also possible to apply by means of the nipple 10 compressed air or hot steam to the cylindrical wire mesh membrane 7.

The medium to be filtered is admitted through the inlet 5 and flows out of the system through the outlet 6. Due to the differential between the pressures prevailing at the inner surface of the cylindrical membrane 7 and inside the space between the cylindrical membrane 7 and the pipe 2, permeate will diffuse through the fine pores in the cylindrical wire mesh membrane 7, flowing out of the system through the permeate outlet 10. The outflow of permeate 10 is very slow in comparison with the volume flowing through the space inside the cylindrical wire mesh membrane 7. Thus in a typical electrocoating system an hourly throughput rate of 12000 liters of electrolyte through the ultrafiltration separator will be achieved, while about 80 liters of permeate will be recovered per hour. This quantity is however sufficient to rinse the coated objects and to remove excess liquid from the solution.

The sandwich-type ultrafiltration separator 11 illustrated in FIGS. 2 and 3 comprises a housing 12 in which wire mesh membranes 15 are arranged parallel one to the other. The wire mesh membranes 15 may be stacked in several layers, one over the other. These wire mesh membranes 15 are clamped between two frames 13, 16, which exhibit crossbars 14, 17 situated at an inclined angle. The crossbars 17 serve to support the wire mesh membrane 15 along the normal direction of diffusion from the pressurized side to a permeate outlet 21 while the crossbars 14 form the elongated elevations which generate turbulence. To ensure that the medium being filtered will flow parallel to the wire mesh membranes 15 from an inlet 19 to an outlet 20, the height of the crossbars 14 is less than that of the frame 13. The crossbars 14, 17 are situated at an inclined angle in order to carry away to the side solids which collect in the dead water zones at the crossbars 14.

The permeate migrating through the wire mesh membranes 15 is discharged through the permeate outlets 21. These permeate outlets 21 can also be used as previously mentioned in reference to the device as per FIG. 1 to clean the wire mesh membrane 15 by back flushing. In the embodiment shown, two wire mesh membranes 15 are located parallel one to the other and in their frames 13, 6. Further frames 18 are provided toward the side wall of the housing 12, these serving as spacers, allowing the permeate to flow to the permeate outlets 21.

It is of course possible to expand the sandwich-type filter illustrated in FIGS. 2 and 3 by situating in parallel a plurality of wire mesh membranes and to increase the throughput rate as was previously described in reference to the embodiment as per FIG. 1, there using concentric, cylindrical wire mesh membranes.

The metal wire mesh exhibits a wire diameter of less than 0.02 mm, exhibiting more than 2000 picks, i.e. more than 2000 pores per inch, preferably more than 3000 picks, i.e. more than 3000 pores per inch, with the size of the mesh openings reduced to less than 0.004 mm or preferably to less than 0.002 mm by rolling or pressing the mesh flat, thus making the mesh suitable for use as an ultrafiltration membrane.

I claim:

1. An ultrafiltration separator membrane for an ultrafiltration separator, the membrane consisting essentially a metal wire mesh wire a wire of less than 0.02 mm in diameter, exhibiting more than 2000 picks, i.e. more than 2000 pores per inch and with the size of the mesh openings less than 0.004 mm.

2. The membrane of claim 1 wherein the metal wire mesh is made of stainless steel wire.

3. The membrane of claim 1 wherein the metal wire mesh is made of titanium wire.

4. The membrane of claim 1, wherein the size of the mesh opening is reduced to less than 0.004 mm by rolling or pressing the mesh flat.

5. The ultrafiltration separator according to claim 4, further comprising elevations for generating turbulence being located on the membrane and oriented transverse to the direction of flow.

6. The ultrafiltration separator of claim 5, wherein the size of the mesh opening is reduced to less than 0.004 mm by rolling or pressing the mesh flat.

7. Ultrafiltration separator according to claim 5, wherein the elevations comprise elongated elevations located at right angles to the direction of flow.

8. Ultrafiltration separator according to claim 5, wherein the elevations comprise elongated elevations woven into the membrane.

9. Ultrafiltration separator according to claim 5, wherein the elevations comprise elongated elevations positioned on the surface of the membrane.

10. Ultrafiltration separator according to claim 5, further comprising a rectangular frame on which the membrane is positioned, including crossbars situated transverse to the direction of flow.

11. Ultrafiltration separator according to claim 10, further comprising two rectangular frames with crossbars thereon which are situated transverse to the direction of flow and the membrane being clamped between the frame.

12. Ultrafiltration separator according to claim 11, wherein the frame is comprised of strips and the crossbars on the pressurized side of the membrane being lower in profile than the strips comprising the frame.

13. Ultrafiltration separator according to claim 11, further comprising a plurality of the frames with a plurality of the membranes being located parallel one to the other to form a sandwich-type filter.

14. Ultrafiltration separator according to claim 5, wherein the membrane comprises at least one cylindrical membrane and the passing means comprises a pipe with the membrane being located inside the pipe at a distance from the inside wall of the pipe and sealed at the ends of the pipe, the pipe having the ends fitted with end caps, one end cap having an inlet and one end cap having an outlet for the medium to be filtered.

15. Ultrafiltration separator according to claim 14, further comprising a spacer for the membrane in the form of a cylindrical, helical located inside the pipe and in contact with the inside wall of the pipe.

16. Ultrafiltration separator according to claim 15, wherein the cylindrical helical spring exhibits a wire diameter of 4 mm and a pitch of 30 mm at pipe inside diameter of 80 mm.

17. Ultrafiltration separator according to claim 15 further comprising a cylindrical helical spring located inside the cylindrical membrane and in contact with the inside surface of the membrane.

18. Ultrafiltration separator according to claim 17, wherein the cylindrical helical spring located inside the cylindrical membrane is one of left-handed or right-handed and the cylindrical helical spring located between the membrane and the inside pipe wall is the other of left-handed or right-handed.

19. Ultrafiltration separator according to claim 17, wherein the cylindrical helical spring located inside the cylindrical membrane exhibits a wire diameter of 4 mm and a pitch of 30 mm at pipe inside diameter of 80 mm.

20. Ultrafiltration separator according to claim 14, further comprising at least one outlet for permeate being located in the pipe wall.

21. Ultrafiltration separator according to claim 14, comprising multiple cylindrical ones of the membranes arranged concentrically inside the pipe and at a radially spaced distance one from another.

22. Ultrafiltration separator according to claim 5, comprising multiple ones of membrane layers one over another.

23. An ultrafiltration separator membrane for an ultrafiltration separator, the membrane consisting essentially of a metal wire mesh with a wire of less than 3000 picks, i.e. more than 3000 pores per inch and with the size of the mesh openings less than 0.002 mm.

24. The membrane of claim 23, wherein metal wire mesh is made of stainless steel wire.

25. The membrane of claim 23, the metal wire mesh is made of titanium wire.

26. An ultrafiltration separator comprising:
 means for passing a fluid to be ultrafiltered, the means including a fluid inlet and a fluid outlet spaced away from the inlet;
 an ultrafiltration separator membrane supported between the inlet and the outlet, the membrane having a surface for the passing means to pass the fluid along the surface of the membrane;
 the membrane consisting essentially of a wire mesh made of stainless steel or titanium wire with a wire diameter of less than 0.02 mm, exhibiting more than 2000 picks, i.e. more than 2000 pores per inch and with the size of the mesh openings less than 0.004 mm
 the membrane surface being arranged parallel to the direction of flow of the medium being filtered.

* * * * *